United States Patent [19]
Emery

[11] Patent Number: 5,673,956
[45] Date of Patent: Oct. 7, 1997

[54] BEDLINER WITH FLOOR HOLE ENGAGEMENT

[75] Inventor: Phillip L. Emery, Portage, Wis.

[73] Assignee: Penda Corporation, Portage, Wis.

[21] Appl. No.: 515,381

[22] Filed: Aug. 15, 1995

Related U.S. Application Data

[63] Continuation of Ser. No. 365,051, Dec. 27, 1994, abandoned, which is a continuation of Ser. No. 132,760, Oct. 6, 1993, abandoned.

[51] Int. Cl.⁶ .................. B60R 13/01; B60R 13/07
[52] U.S. Cl. ........................... 276/39.2; 296/208
[58] Field of Search ................ 296/39.1, 39.2, 296/38, 208; 105/423

[56] References Cited

U.S. PATENT DOCUMENTS

| | | | |
|---|---|---|---|
| Re. 32,198 | 7/1986 | Wayne | 296/39.2 |
| 542,714 | 7/1895 | Read | 296/38 X |
| 688,680 | 12/1901 | Pennington | 296/38 X |
| 2,876,712 | 3/1959 | Oakley | 105/369 |
| 3,143,373 | 8/1964 | Fordyce | 296/208 X |
| 4,169,415 | 10/1979 | Winsor | 296/39.1 X |
| 4,176,877 | 12/1979 | Schulz | 296/208 |
| 4,944,612 | 7/1990 | Abstetar et al. | 296/39.2 |
| 5,131,709 | 7/1992 | Spica | 296/39.2 |
| 5,221,119 | 6/1993 | Emery | 296/39.2 |

FOREIGN PATENT DOCUMENTS

| | | | |
|---|---|---|---|
| 3021388 | 12/1981 | Germany | 296/208 |
| 34952 | 2/1984 | Japan | 296/39.1 |
| 67177 | 4/1984 | Japan | 296/208 |
| 95982 | 4/1989 | Japan | 296/208 |
| 127141 | 5/1990 | Japan | 296/39.2 |
| 669054 | 3/1952 | United Kingdom | 296/208 |

OTHER PUBLICATIONS

Photos of Durakon "All Star" bed liner, undated.

*Primary Examiner*—Dennis H. Pedder
*Attorney, Agent, or Firm*—Lathrop & Clark

[57] ABSTRACT

A thermoformed thermoplastic bed liner has a bottom wall which overlies the floor of a truck cargo bed and two side walls which extend upwardly and outwardly from the bottom wall on opposite sides. A rolled lip extends downwardly from the liner bottom wall into a hole in the bed floor and allows access to a tie down pin. An alternative bed liner has a raised lip which extends above the truck bed floor to prevent the entrance of liquids into the hole. Another alternative bedliner has a routed opening around the bed hole which is fitted with a robber cap with a rolled lip or with a rubber cap with a barbed edge which engages beneath the bed floor opening.

4 Claims, 6 Drawing Sheets

BEDLINER WITH FLOOR HOLE ENGAGEMENT

This is a continuation of application Ser. No. 08/365,051, filed Dec. 27, 1994, Entitled "BEDLINER WITH FLOOR HOLE ENGAGEMENT", now abandoned, which is a continuation of U.S. patent application Ser. No. 08/132,760 filed Oct. 6, 1993, now abandoned.

FIELD OF THE INVENTION

This invention relates to truck bed liners in general and to thermoformed thermoplastic truck bed liners in particular.

BACKGROUND OF THE INVENTION

Although long used in agricultural and commercial applications, pick-up trucks with open cargo beds have also become increasingly popular as personal and family vehicles. The commercial vehicle owner, although concerned with performance and cost effectiveness of the vehicle, often considers the vehicle as a traveling company advertisement or symbol. A neat and well-maintained vehicle is more likely to favorably impress customers. Owners of personal vehicles, while concerned with functionality and efficiency, are also concerned with pride of ownership, personal image, and outward appearances. In addition, the automotive enthusiast desires to maintain his vehicle in as close to a "like new" condition as possible.

Truck bed liners of plastic or rubber are commonly employed to protect the painted metal surfaces of a pick-up truck cargo bed. These truck bed liners are available in a wide variety of configurations to suit the wide variety of available trucks. Bed liners protect the cargo bed from scratching and denting as well as paint fading from exposure to sunlight and elements. One-piece thermoformed thermoplastic truck bed liners provide a cost-effective means of protecting the truck cargo bed.

Certain pick-up trucks are provided with holes in the floor of the truck bed which allow direct access to tie-down pins connected to frame members or to the frame itself. A conventional bed liner which has an uninterrupted floor panel does not allow access to this truck bed feature.

An unprotected opening in the bottom wall of a truck bed liner, however, may allow exposure of the truck bed sheet metal to moisture or particles which enter through the hole in the bed floor and which become trapped between the metal and the protective liner. Entrance of contaminants may result in wearing or rusting of the truck bed.

What is needed is a truck bed liner which allows access to truck structure beneath the level of the truck bed and yet which protects the track bed from exposure to the elements and degradation.

SUMMARY OF THE INVENTION

The truck bed liner of this invention is a unitary thermoformed thermoplastic article which mounts within a vehicle cargo bed. The bed liner has a bottom wall and two side walls which extend upwardly from opposite sides of the bottom wall. The liner bottom wall has portions that define a hole which overlies a floor hole in the truck box above a tie-down pin. Potions of the liner extend downwardly into the floor hole to form a rolled lip which prevents moisture and debris particles from entering between the floor and the bed liner bottom wall.

An alternative embodiment bed liner has, in addition to a rolled lip, a raised lip which extends above the truck box floor and acts as a dam to prevent entry of liquids into the floor hole.

Another alternative bed liner has a routed holed in the liner bottom wall with no lip. A rubber plug is insertable within this hole which has a rolled lip or a rolled lip with an outwardly extending barb which engages with underside structure of the box floor hole.

It is an object of the present invention to provide a bed liner which allows access therethrough to truck structure beneath the truck bed.

It is a further object of the present invention to provide a truck bed liner which restricts water flow into holes in the truck bed.

It is an additional object of the present invention to provide a truck bed liner which prevents the entry of water and particulate matter between the bottom wall of the liner and the truck box floor.

Further objects, features, and advantages of the invention will be apparent from the following detailed description when taken in conjunction with the accompanying drawings.

DESCRIPTION OF THE PREFERRED EMBODIMENTS

Figure 1:
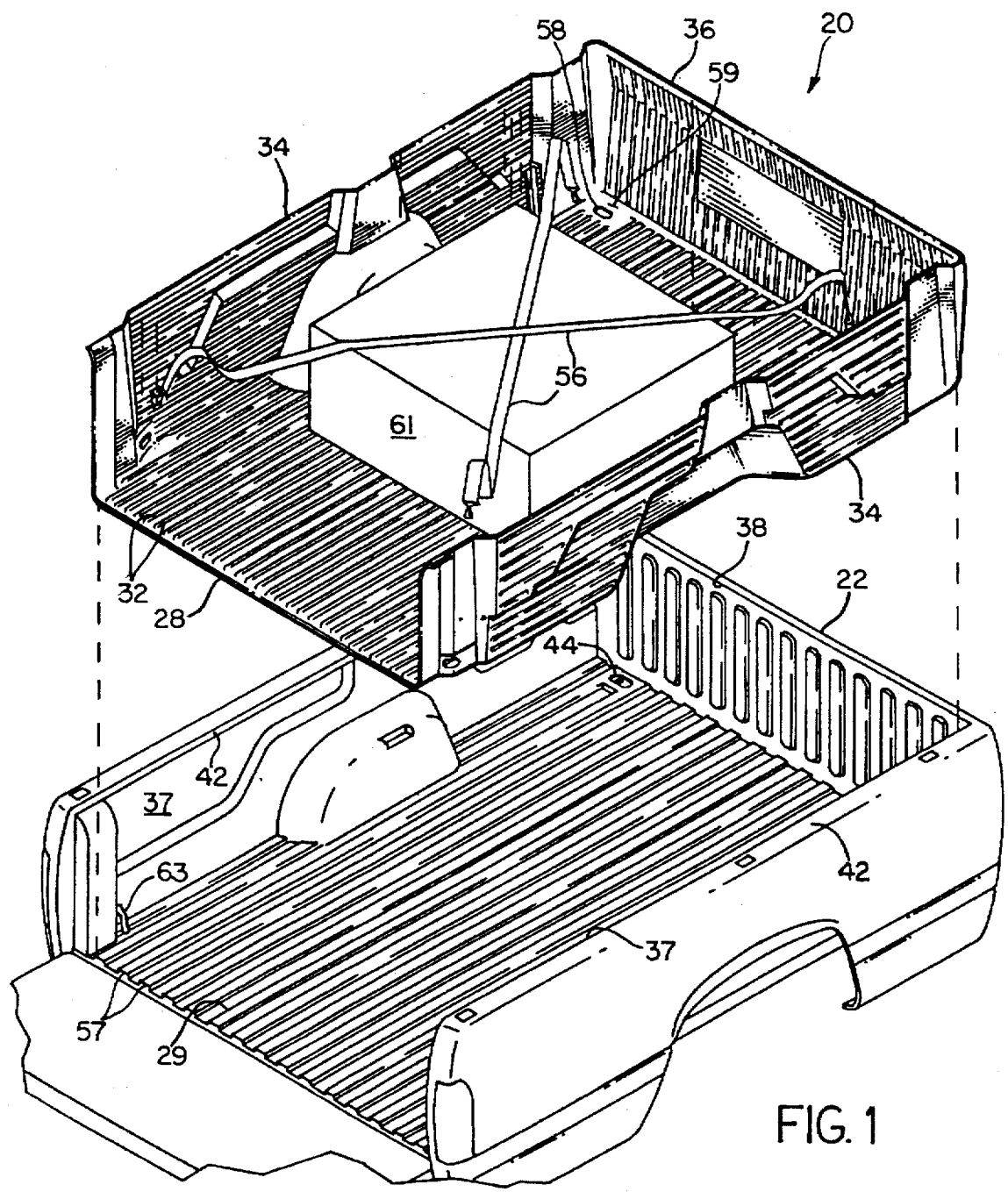
FIG. 1 is an exploded isometric view of the bed liner of this invention in relation to a pickup truck bed.

Referring more particularly to FIGS. 1–10, wherein like numbers refer to similar parts, a bedliner 20 is shown in relation to the bed of a conventional pickup truck 22 in FIG. 1. The bedliner 20 is formed from thermoplastic material such as high density polyethylene through the single sheet thermoforming process. In this process a planar sheet of extruded thermoplastic material, which may be preformed with a pattern on one surface, is heated and then positioned over a vacuum thermoforming mold. A vacuum is drawn on the mold to bring the semi-molten plastic into contact with the mold where it is formed to a desired shape. After the part has at least partly cooled it is removed from the mold and trimmed to its final configuration and any through holes are formed in the pan through drilling or routing.

As shown in FIG. 1, the bed liner 20 has a bottom wall 28 which overlies and covers the truck cargo bed floor 29. The bed liner bottom wall 28 extends generally in a horizontal plane. However, it is preferably provided with a series of inverted U-shaped longitudinal ribs 32 which contribute to the rigidity of the bottom wall. The bed liner 20 has been illustrated as an under-the-rail bed liner, but it should be understood that an over-the-rail liner including the novel features of this invention may also be formed.

Figure 2:
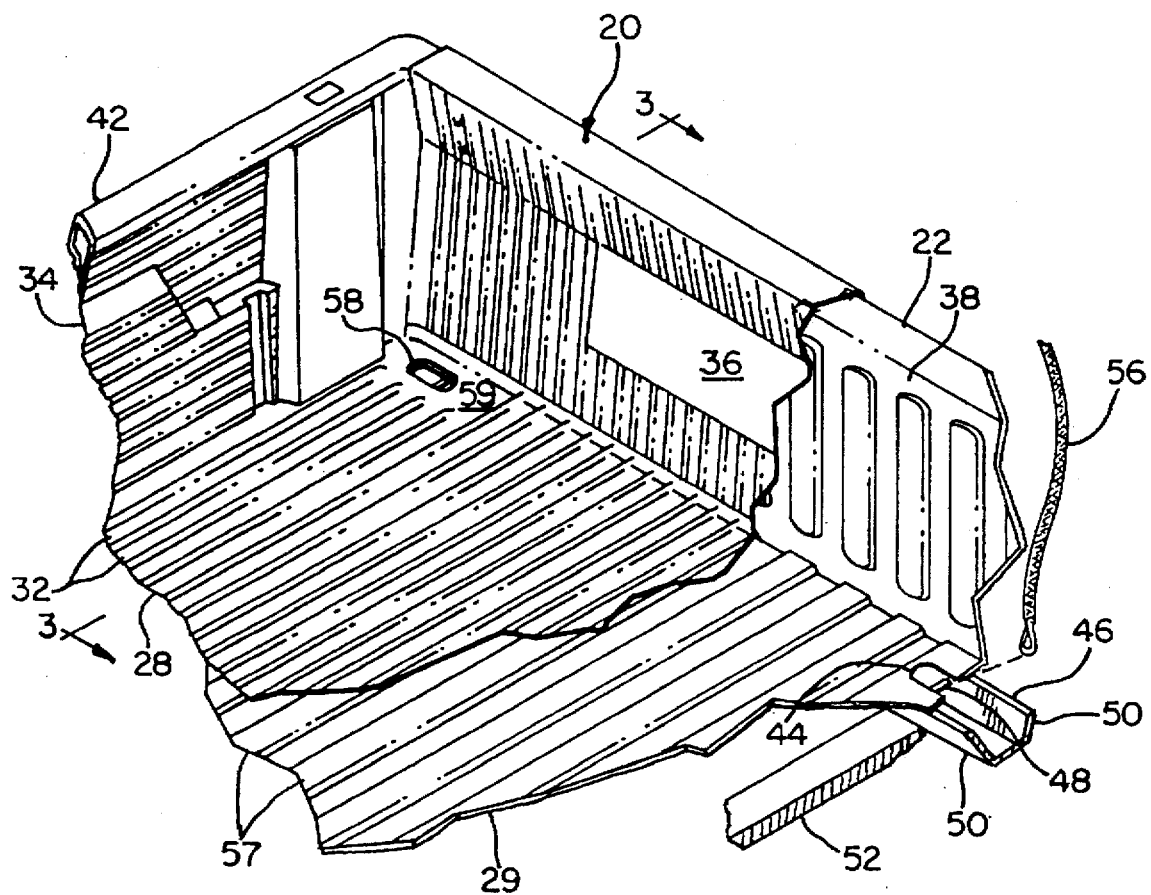
FIG. 2 is an isometric view, partly cut-away, of the bed liner of FIG. 1 installed within a truck bed.

Two side walls 34 extend upwardly from the bed liner bottom wall 28 and are inclined from the liner bottom at an angle greater than perpendicular, preferably an angle of up to twelve degrees outwardly from vertical. The side walls 34 are joined at the front of the bed liner by a liner front wall 36 which extends upwardly from the bed liner bottom wall 28 to cover the truck bed front wall 38. The bed liner side walls are positioned on the interior sides of the track cargo bed side walls 37 and serve to shield and protect the side walls from soiling and damage. As shown in FIG. 2, each bed liner side wall 34 has an upper margin 40 which engages against a truck cargo bed side wall 37 beneath a truck bed side rail 42.

As shown in FIG. 2, the bed liner 20 is formed to cooperate with a truck 22 which has two floor access holes 44 located over a metal U-channel 46. The U-channel 46 is located directly beneath the cargo bed floor in the front of the cargo bed 48 defined by the floor 29, the side walls 37, and the front wall 38 of the truck 22.

Figure 3:
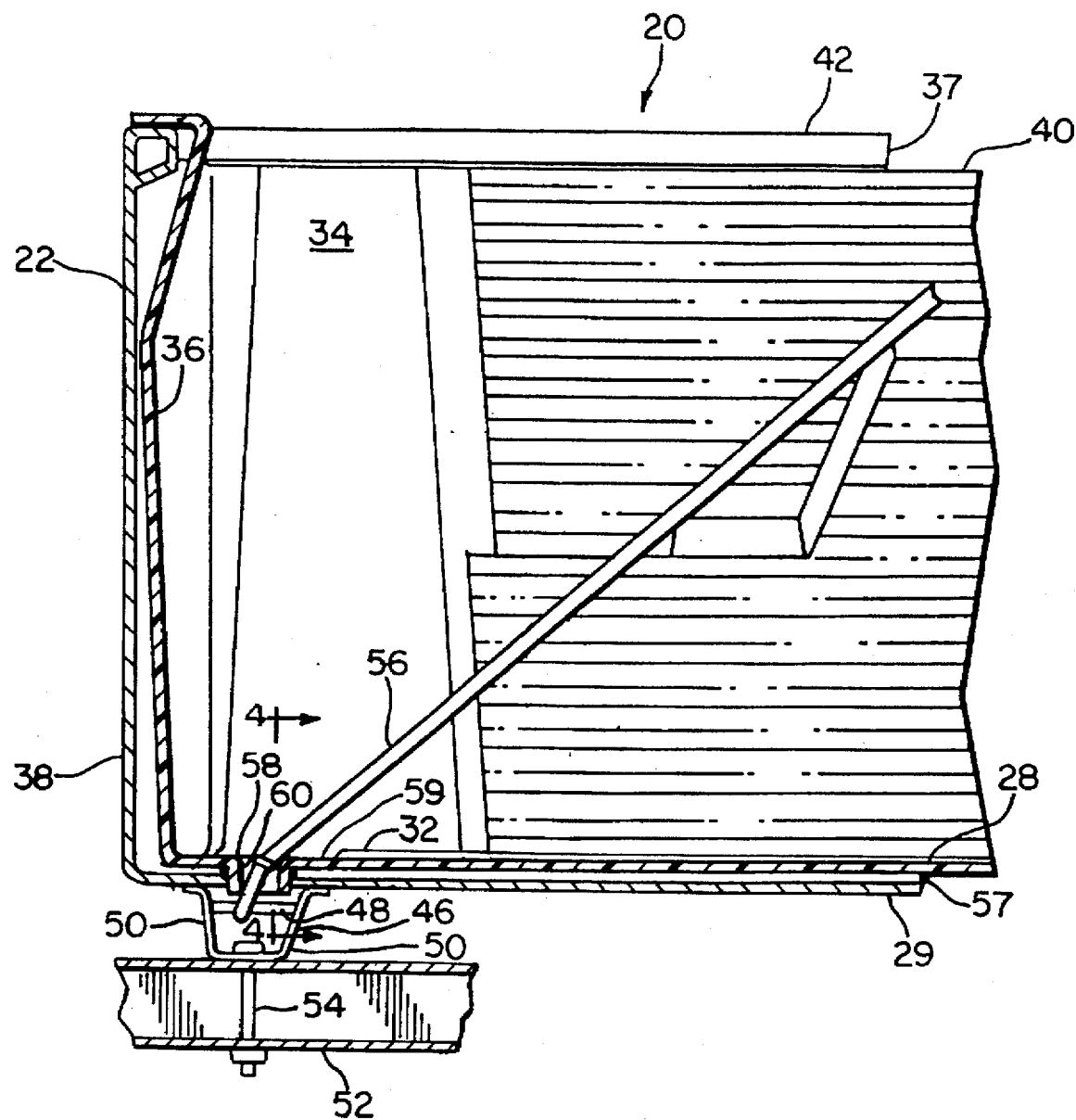
FIG. 3 is a cross-sectional view of the bed liner of FIG. 2 taken along section line 3—3.

As shown in FIG. 3, A pin 48 extends between the vertical walls 50 of the U-channel 46 and extends in a front-to-back orientation. The U-channel 46 is in turn connected to a frame member 52 of the truck 22 which extends from front to back, typically by a bolt fastener 54. The U-channel 46, and hence the pins 48, provide a rigid tie-down point for attachment of straps or cords 56 which may be looped around freight for holding it in position within the truck bed.

The bed liner 20 has openings 58 in the bottom wall 28 which are positioned to overlie the two floor access holes 44 and which allow the cords 56 to be passed through the bottom wall 28 of the finer and to engage with the tie-down pins 48. To restrict the penetration of water, dust, dirt, and other debris through the access holes 44 into the truck bed beneath the liner 20, a robbed lip 60, shown in FIG. 4, extends downwardly from the bottom wall of the liner 20 into the U-channel 46, terminating above the pin 48. The openings 58 are positioned in level regions 59 of the bottom wall in which liner ribs 29 are not formed.

The lip 60 is a shell with a generally oval cross-section which conforms to the outline of the access hole 44 into which it extends. The vertically extending lip thus extends across and blocks access to the junction between the bottom wall 28 and the truck bed floor 29. As shown in FIG. 2, the floor 29 of the truck 22 may also have ribs 57 formed in its sheet metal running from front to rear of the truck bed. Thus at the junction between the liner and the bed floor the liner bottom wall may be spaced a fraction of an inch above the floor 29. The lip 60 blocks material which might come upward through the access hole 44, and furthermore acts as a drain to direct liquids such as rain water into the access hole past the junction and into the U-channel 46 which is provided with drain holes (not shown).

As shown in FIG. 1, an article 61 may be strapped into place within the truck bed by cords 56 which extend from the fie-down pins 48 to other attachment features 63 of the truck bed.

Figure 5:
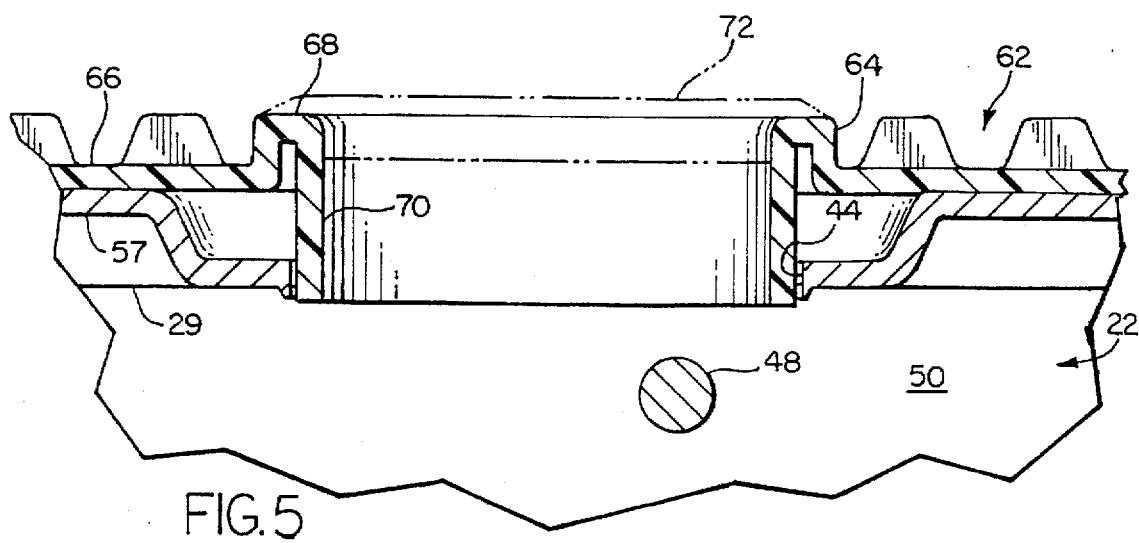
FIG. 5 is a cross-sectional view of an alternative embodiment bed liner of the present invention having a raised lip surrounding a floor hole and an insertable plug shown in phantom view.

An alternative embodiment bed liner 62 is shown in FIG. 5 which has a raised dam wall 64 which surrounds the fie-down access hole 44 and which extends above the level of the bottom wall 66 of the bed liner 62. A flange 68 extends radially inwardly from the dam 64 and a vertical lip 70 extends downwardly from the flange to a level beneath the floor 29 of the truck 22. The bed liner 62 restricts access of liquids and particulate matter into the juncture between the liner and the truck bed floor 29, but the raised dam wall 64 prevents accumulated water within the bed liner 62 from draining into the access hole 44.

Figure 4:
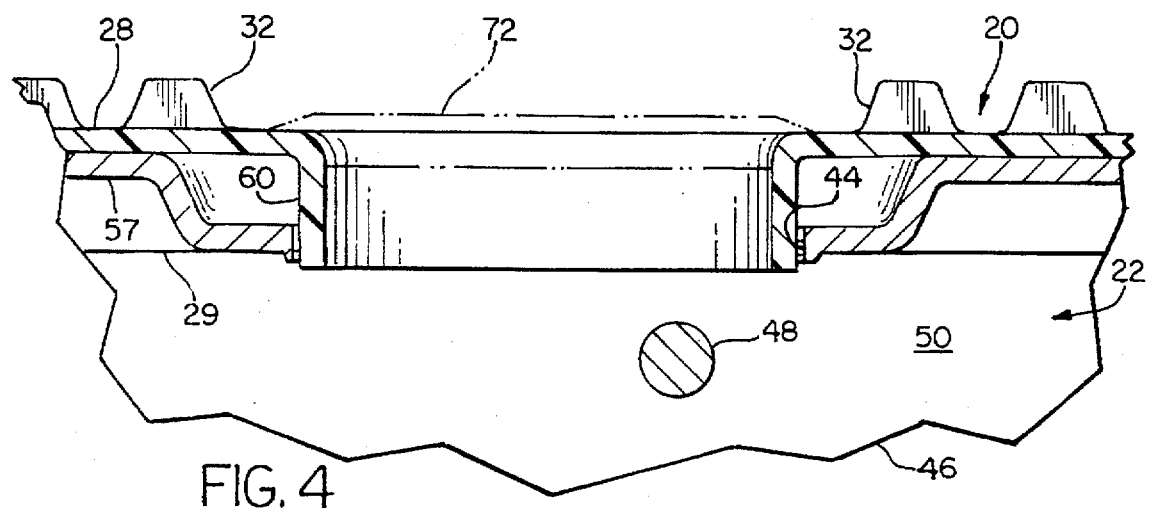
FIG. 4 is an enlarged cross-sectional view of the bed liner of FIG. 3 taken along section line 4—4, shown with an inserted rubber plug in phantom view.
Figure 8:
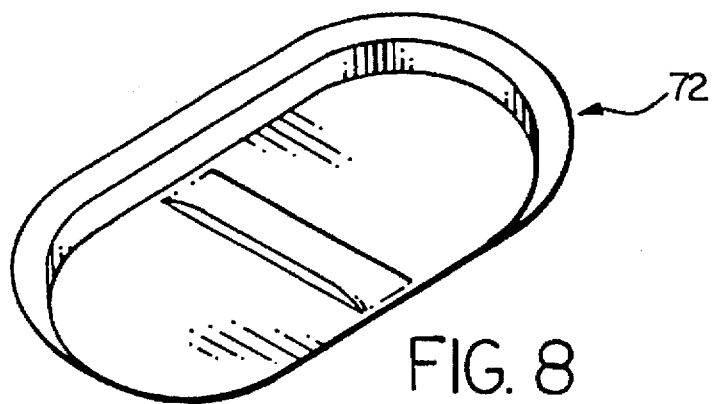
FIG. 8 is a bottom isometric view of the plug of FIG. 4

As shown in FIGS. 4 and 5, both the bed liners 20, 62 may receive a rubber oval plug 72, shown in FIG. 8, which conforms to the shape of the tie-down openings 58. The plug 72 is a solid rubber resilient stopper which may be inserted in the tie-down opening 58 of the bed liner to prevent material passing therethrough. The plug 72, however, also prevents access to the tie-down pin 48.

Figure 6:
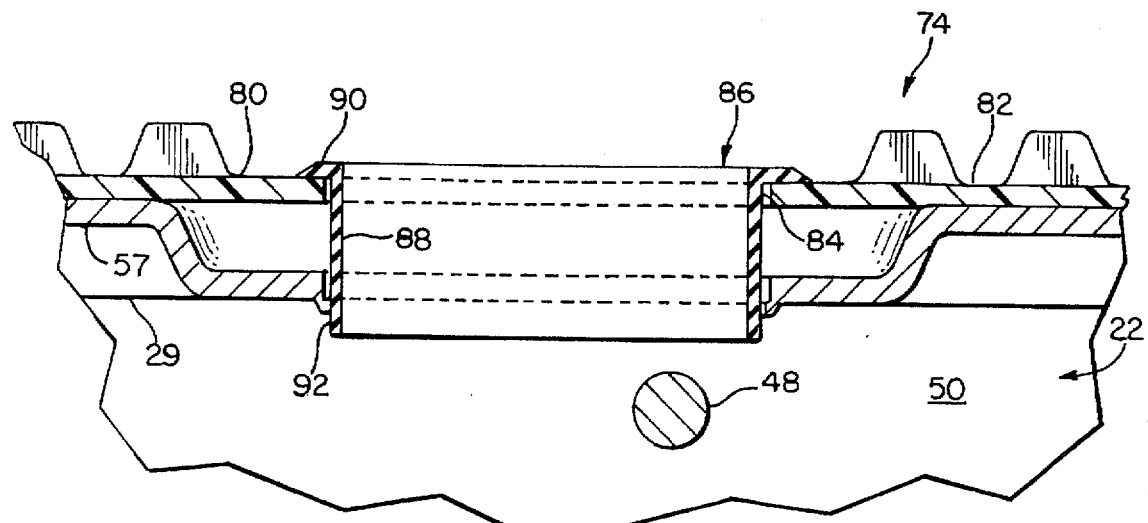
FIG. 6 is a cross-sectional view of a second alternative embodiment bed liner of this invention employing a floor hole plug with a rolled lip.
Figure 7:
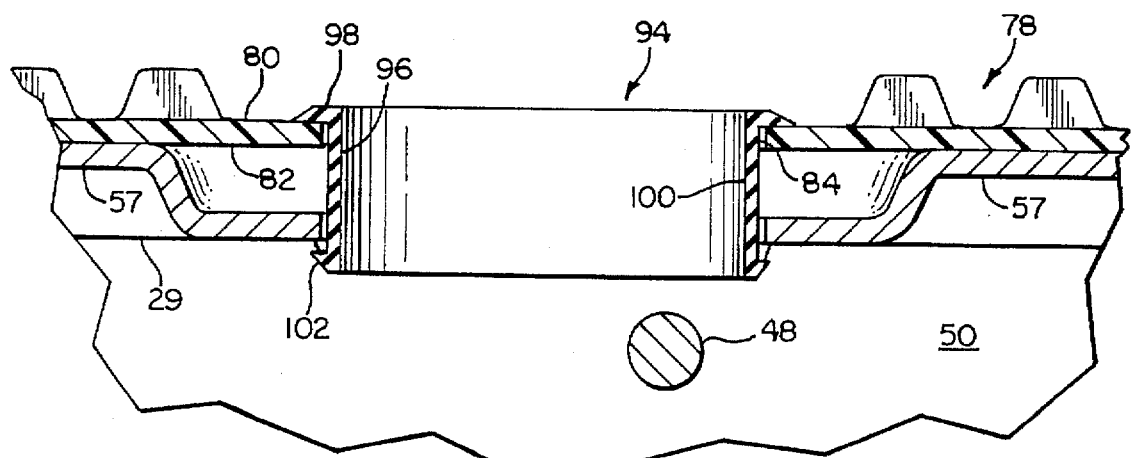
FIG. 7 is a cross-sectional view of a third alternative embodiment bed liner of the present invention having a floor hole plug with a barbed lip.

Alternative embodiment bed liner assemblies 74 and 78, shown in FIGS. 6, and 7 respectively, employ a bed liner 80 which has a bottom panel 82 having simple routered tie-down openings 84 which overlie the tie-down access hole 44 in the truck floor 29.

Figure 9:
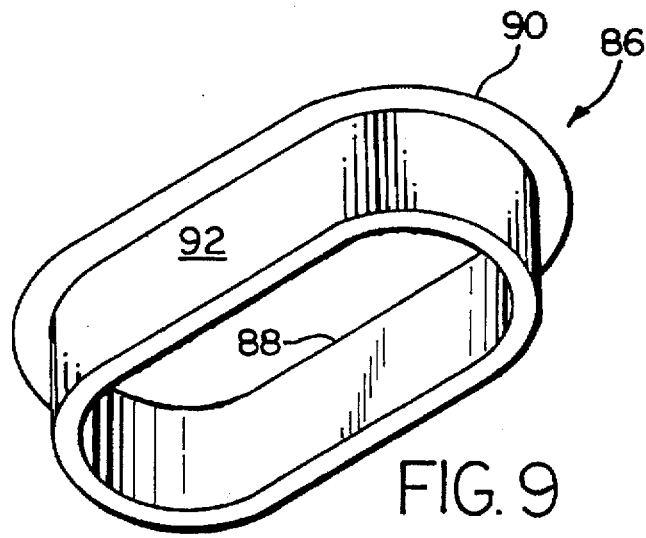
FIG. 9 is a bottom isometric view of the plug of FIG. 6

In the bed liner assembly 74, shown in FIG. 6, a rubber plug 86, shown in FIG. 9, is inserted into each tie-down opening 84. Each plug 86 has a through hole 88 which extends the length of the plug 86 forming a shell-like lip 92 which allows liquid to drain through the plug 86. An outwardly extending flange 90 supports the plug on the liner 80.

Figure 10:
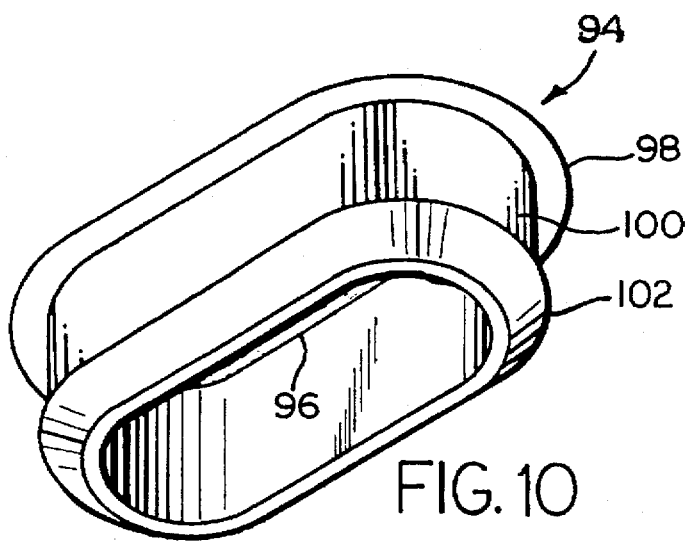
FIG. 10 is a bottom isometric view of the plug of FIG. 7

In the bed liner assembly 78, shown in FIG. 7, a rubber plug 94, shown in FIG. 10, is inserted into each tie-down opening 84. The plugs 94 also have a through hole 96 which extends the length of the plug to form a shell-like lip 100 with an upper flange 98 which overlies the liner bottom panel 82. The plug 94 also has a lower barbed flange 102 which extends from the lower portion of the lip 100 and which has a tapered lower surface to permit the plug to be inserted through the access hole 84 such that the lower flange 102 extends beneath the truck bed floor 29 to secure the plug 94 in place.

It should be noted that bed liners of the present invention may be formed to be utilized with a wide variety of conventional truck beds, in which case the molded liner may take on a general shape which conforms to the dimensions of the particular bed.

It is understood that the invention is not confined to the particular construction and arrangement of pans herein illustrated and described, but embraces all such modified forms thereof as come within the scope of the following claims.

I claim:

1. A thermoformed thermoplastic bed liner for mounting within a vehicle cargo bed having a floor with portions defining an access hole therein, comprising:
   a) a one-piece thermoformed thermoplastic truck bed liner having a bottom wall which overlies the vehicle floor;
   b) portions of the bottom wall of the one-piece liner forming a downwardly extending lip which defines an opening, the lid being one-piece with the bottom wall of the bed liner where the lip is constructed and arranged to extend into the access hole and beneath the vehicle floor to restrict entry of foreign matter between the liner and the floor through the access hole; and
   c) means for restraining a load which passes through the opening defined by the lip for attachment to a structural member of the vehicle.

2. The truck bed liner of claim 1 further comprising portions of the bottom wall which form an upwardly extending the rim, the rim surrounding the access hole to form a dam to restrict entry of liquids into the access hole, and wherein the lip extends downwardly from the rim.

3. A one-piece thermoformed thermoplastic truck bed liner for use in the cargo bed of a truck, the cargo bed having a floor, and the floor having therein an access hole to radiate access to underlying tie-down structure on the truck, the one-piece truck bed liner comprising:

a) opposite side walls; and b) a bottom wall molded and formed integrally with the side walls, the bottom wall including a downwardly extending annular lip, the lip being one-piece with the bottom wall of the bed liner, the lip defining an access opening, and the lip being constructed and arranged to extend into the access hole and beneath the floor of the cargo bed when the truck bed liner is placed thereon to close off the access hole and to thereby restrict entry of foreign matter between the bottom wall and the floor of the cargo bed through the access opening and permit access to the tie-down structure through the access opening, and wherein the truck bed liner is a one-piece integrally molded unit formed of a single sheet of thermoplastic material.

4. A truck bed liner as set forth in claim 3 wherein the bottom wall includes an upwardly extending rim surrounding the opening in the bottom wall, the rim forming a dam to restrict liquid on the bottom wall from draining into the opening in the bottom wall, the lip extending downwardly from the rim.

* * * * *

UNITED STATES PATENT AND TRADEMARK OFFICE
CERTIFICATE OF CORRECTION

PATENT NO. : 5,673,956
DATED : October 7, 1997
INVENTOR(S) : Phillip L. Emery

It is certified that error appears in the above-identified patent and that said Letters Patent is hereby corrected as shown below: Title page, item [52], U.S. Class "276/39.2" change to --296/39.2 --.

In Abstract line 10, change "robber" to --rubber--.

In column 3, line 12, change "track" to -- truck --.

In column 3, line 38, change "robbed" to -- rolled--.

In column 3, line 60, change "fie-down" to -- tie-down --.

In column 3, line 64, change "fie-down" to -- tie-down --.

In column 4, line 53, change "lid" to --lip --.

In column 4, line 54, change "where" to -- wherein --.

In column 4, line 63, change "extending the rim" to -- extending rim --.

In column 5, line 1, change "radiate" to --facilitate --.

Signed and Sealed this

Ninth Day of February, 1999

Attest:

Attesting Officer

*Acting Commissioner of Patents and Trademarks*